United States Patent
Bell et al.

(10) Patent No.: US 7,168,329 B2
(45) Date of Patent: Jan. 30, 2007

(54) LOW MASS CORIOLIS MASS FLOWMETER HAVING A LOW MASS DRIVE SYSTEM

(75) Inventors: Mark James Bell, Arvada, CO (US); Roger Scott Loving, Boulder, CO (US); Joseph C. Dille, Telford, PA (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 10/540,177

(22) PCT Filed: Feb. 4, 2003

(86) PCT No.: PCT/US03/03335

§ 371 (c)(1),
(2), (4) Date: Jun. 17, 2005

(87) PCT Pub. No.: WO2004/072591

PCT Pub. Date: Aug. 26, 2004

(65) Prior Publication Data

US 2006/0042402 A1 Mar. 2, 2006

(51) Int. Cl.
*G01F 1/84* (2006.01)
(52) U.S. Cl. ............... 73/861.355; 73/861.357
(58) Field of Classification Search .......... None
See application file for complete search history.

(56) References Cited

U.S. PATENT DOCUMENTS

| | | |
|---|---|---|
| 4,777,833 A | 10/1988 | Carpenter |
| 4,949,583 A | 8/1990 | Lang et al. |
| 5,069,075 A | 12/1991 | Hansen et al. |
| 5,531,126 A | 7/1996 | Drahm |
| 6,164,140 A | 12/2000 | Kalinoski |
| 6,776,053 B2 * | 8/2004 | Schlosser et al. ...... 73/861.355 |
| 2003/0097881 A1 * | 5/2003 | Schlosser et al. ...... 73/861.355 |

FOREIGN PATENT DOCUMENTS

GB    2221302 A    1/1990

* cited by examiner

*Primary Examiner*—Harshad Patel
(74) *Attorney, Agent, or Firm*—The Ollila Law Group LLC

(57) ABSTRACT

A Coriolis mass flowmeter (300) having a low mass drive system comprising a driver coil (D) for vibrating flow tube means (102). The Coriolis mass flowmeter does not use a magnet affixed to the flow tube means. Instead, the flow tube means is coated with or is integral to magnetic material (103) that responds to the magnetic fields generated by the driver coil to vibrate the flow tube means. The flow tube means may comprise one (102) or more (1402C1, 1402C2) flow tubes. The magnetic material may be ferrous material devoid of an internal magnetic field. Alternatively the magnetic material may be steel or stainless steel having internal magnetic fields.

42 Claims, 8 Drawing Sheets

LOW MASS CORIOLIS MASS FLOWMETER HAVING A LOW MASS DRIVE SYSTEM

FIELD OF THE INVENTION

This invention relates to a Coriolis mass flowmeter and in particular to a lightweight Coriolis mass flowmeter having a low mass drive system. This Invention further relates to a lightweight Coriolis mass flowmeter having a small diameter flow tube. This invention still further relates to a small, lightweight Coriolis mass flowmeter suitable for measuring low volume mass flow rates.

PROBLEM

Coriolis mass flowmeters are available in various sizes and flow capacities to measure material flow and generate information such as mass flow rates, density, etc., pertaining to the material flow. Coriolis mass flowmeters typically have one or more flow tubes of straight or irregular configuration which are vibrated transversely by an electromagnetic driver. The material flow through the vibrating flow tube induces Coriolis deflections of the flow tube which are detected by one or more pick-offs. The pick-offs generate output signals that are transmitted to associated meter electronics for the generation of material flow information. The Coriolis deflections and resultant output signals generated by the pick-offs are proportional to the mass of the fluid flowing through the flow tube. The Coriolis deflections and resultant output signals generated by the pick-offs are enhanced when the material-filled flow tube has a relatively large mass compared to the mass of the associated driver and pick-offs.

Typical dual curved-tube Coriolis flowmeters have flow rates ranging from approximately 100 to 700,000 kg/hour and have flow tubes with inside diameters ranging from approximately 0.3 cm to 11 cm. The desired ratio of the mass of the material filled flow tube to the mass of the driver and the pick-offs is typically in the range of 10 to 1 or higher. The ratio is achievable in conventional Coriolis flowmeters due to the relatively large mass of the material filled flow tube as compared to the relatively low mass of the associated drivers and pick-offs.

It is a problem to achieve an acceptable mass ratio in lightweight Coriolis mass flowmeters using conventional magnets and associated mounting apparatus affixed to the vibrating flow tube structure. The driver used to vibrate a material filled metal flow tube is typically a magnet/coil combination with the magnet typically being affixed to the flow tube and the coil being affixed to a supporting structure or to another flow tube. Magnet mass is a problem in the provision of lightweight flowmeters since the minimum magnet size available is limited by metallurgical considerations to approximately 5 mg. With associated hardware used to attach the magnet to the flow tube, the combined mass is approximately 7 mg. This requires that the mass of the material filled flow tube be at least 70 mg to achieve the desired mass ratio of 10 to 1. It is a problem to provide Coriolis mass flowmeters having a materially filled vibrating flow tube structure with a mass below approximately 70 mg for measuring low volume mass flow rates.

SOLUTION

The above and other problems are solved by the present invention in accordance of which a Coriolis mass flowmeter is provided that is small, lightweight, of low mass and ideally suited for the measurement of mass flow and density information for a low volume material flow. The flowmeter of the invention is small, having flow rates at or below approximately 10 kg/hour and flow tubes with inside diameter at or below approximately 2 mm. For instance, the flow tube itself may be as small as a human hair with a proportional wall thickness.

In this invention, the flow tubes may be formed of any suitable material which is then coated with a magnetic material. The magnetic material may be formed by spraying or deposition on the flow tube. The magnetic material may alternatively be made integral with the flow tube or the flow tube may be made of the magnetic material itself. The invention allows for the elimination of discrete magnets avoiding the physical problem of excessive mass as well as the manufacturing problem of aligning and attaching a magnet to the flow tube.

This invention allows the elimination of both driver and sensor magnets. Coriolis sensors commonly use a magnet and coil as a phase-sensing "pick-off" assembly to provide information as to the degree of Coriolis deflection in the flow tube. In accordance with this invention, the magnet for the pick-off assembly may be constructed in the same fashion as for the driver. So either the driver, or the pick-off magnets, or both may be constructed in the fashion disclosed in this invention.

An alternative implementation for a very lightweight flow tube has the driver constructed as described and the pick-off signals generated by optical measurements. Suitable pick-offs are optical devices having a light emitter and a light collector positioned on opposite sides of the flow tube. Flexions of the flow tube modulate the transmitted light beam which is received and converted to output signals representing the flow tube vibration including Coriolis response.

A fundamental advantage of the Coriolis mass flowmeter of the present invention is the use of a magnetic plating or a coating on the flow tube. This plating can be applied via plating bath, vapor deposition, plasma deposition or any other plating system. This is advantageous in that a very thin layer can be deposited on the flow tube or made integral therewith. This results in a very low distributed mass over a specified length of the tube which is then used in conjunction with a drive coil to drive the flow tube at a suitable vibration. The distributed mass of the plating as well as the low plating mass helps to reduce the effects of density changes on the generated output information. The low plating mass also permits the Coriolis mass flowmeter to resonate at an acceptable frequency to permit improved density accuracy.

In accordance with one possible exemplary embodiment of the invention, a magnet coating on the flow tube is used that behaves exactly like a magnet, having an internal North/South field. In accordance with another embodiment of the invention, a plating bath is used to deposit a soft magnetic material ("ferrous" or "permeable") on the flow tube. The ferrous material can only be attracted by a driver coil. A drive system using this material with a single driver coil is of the "pull-only" type rather than the standard "push-pull system" of conventional Coriolis mass flowmeters. However, opposing drive coils driven by each respective half of the drive waveform would enable the flow tube to be alternately pulled in opposing directions at the drive frequency. In accordance with another embodiment, the flow tube itself may be formed of a magnetic material having an internal North/South field.

The plating of the magnetic material can be made continuous on the entire flow tube or only an axial portion with the selective etching being used to form the final plating pattern. The ferrous material can also be made from a composite flow tube where the ferrous material is co-formed on the outside of the flow tube and then selectively etched away.

In accordance with one embodiment of the invention, the flow tube is straight and has magnetic material deposited on an axial center portion of the flow tube. Another embodiment is a u-shaped flow tube having left and right side legs together with a center portion connecting the top of the two side legs. The center portion of the u-shaped flow tube has a layer of magnetic material deposited thereon.

Both the straight tube embodiment and the u-shaped flow tube embodiment embody flowmeters that utilize optical pick-offs for detecting the Coriolis response of the flow tube as it is vibrated by a magnetic coil proximate the deposited layer of magnetic material. In accordance with another embodiment, the magnetic layer is formed of ferrous material and is vibrated in a pull-only mode by a single drive coil. Another embodiment is a flow tube having a layer of soft, magnetic ferrous material is vibrated in a push-pull mode using a pair of coils positioned on opposite sides of the flow tube. Another embodiment has magnetic material positioned only on an axial center portion of the flow tube. Another embodiment includes a flow tube having the entirety of the axial length of the flow tube having a deposited layer of magnetic material. Another embodiment has the entirety of the flow tube formed of a magnetic material. Another embodiment has the magnetic material applied to the entirety of the axial length of the flow tube.

In accordance with another embodiment, the flowmeter has a pair of u-shaped flow tubes having applied magnetic material on a top center portion, optical detectors on each leg of the flow tube and a driver magnet positioned between the flow tubes. In another embodiment the Coriolis mass flowmeter has a pair of straight flow tubes having magnetic material deposited thereon together with optical detectors and a driver coil positioned intermediate the flow tubes. In another embodiment, a pair of straight flow tubes are oriented parallel to each other and vibrated by magnets positioned on the outside of the flow tube. In another embodiment, the Coriolis mass flowmeter has parallel flow tubes formed of a magnetic material that is magnetic and has a driver magnet and a pair of pick-off magnets positioned between the parallel flow tubes.

It is thus seen that the Coriolis mass flowmeter of the present invention achieves an advance in the art by the provision of a Coriolis mass flowmeter that is smaller and of a lower mass by orders of magnitude as compared to the currently available Coriolis mass flowmeters formed of metal. While this invention is directed towards small Coriolis mass flow meters, the advantages described by this solution is equally applicable to larger sensors.

ASPECTS

An aspect of the invention is a Coriolis flow meter comprising:
flow tube means adapted to receive a material flow;
a driver coil;
meter electronics that applies a drive signal to said driver coil to vibrate said flow tube means with material flow;
said flow tube means vibration with material flow generates Coriolis deflections of said flow tube means; and
pick-off means coupled to said flow tube means for generating pick-off signals representing said Coriolis deflections of said flow tube means; and means for applying said pick-off signals to said meter electronics for the generation of output signals representing said material flow;
characterized in that:
magnetic material embodies at least a part of said flow tube means;
said driver coil is responsive the said application of said drive signal to generate a magnetic field that interacts with said magnetic material to vibrate said material filled flow tube means.

Preferably said magnetic material comprises a layer of ferrous material on at least a part of the outer surface of said flow tube means.

Preferably said magnetic material is extant on less than all of the axial length of said flow tube means.

Preferably said magnetic material is extant on the entirety of the axial length of said flow tube means.

Preferably said magnetic material comprises ferrous material integral to at least an outer radial portion of said flow tube means;
said ferrous material is devoid of an internal magnetic field.

Preferably said magnetic material embodies less than all of the axial length of said flow tube means.

Preferably said magnetic material embodies the entirety of the axial length of said flow tube means.

Preferably said magnetic material comprises hard magnetic material having self-contained magnetic fields.

Preferably said magnetic material comprises an outer layer extant on less than all of the axial length of said flow tube means.

Preferably said magnetic material comprise an outer layer extant on the entirety of the axial length of said flow tube means.

Preferably said magnetic material is integral to at least an outer radial portion of said flow tube means.

Preferably said magnetic material embodies less than all of the axial length of said flow tube means.

Preferably said magnetic material embodies the entirety of the axial length of said flow tube means.

Preferably said flow tube means is straight.
Preferably said flow tube means is of an irregular shape.
Preferably said flow tube means is U-shaped.
Preferably said pick-off means comprises a first and a second optical pick-off each comprising a light emitter and a light receiver that converts received light into electrical signals.

Preferably said driver coil vibrates said flow tube means in a pull-only mode in which said flow tube means material is magnetically attracted to said driver coil when energized with a current flow and in which the inherent elasticity of said flow tube means returns said flow tube means to a rest state upon the cessation of current flow.

Preferably said driver coil defines a first driver coil;
said Coriolis flowmeter further comprising a second driver coil;
said first driver coil and said second driver coil are positioned on opposite sides of said flow tube means;
said meter electronics applies opposing sinusoidal currents to said first driver coil and to said second driver coil to generate cyclical changing magnetic fields that vibrate said flow tube means cyclically in a push-pull mode between said first driver coil and said second driver coil.

Preferably mass flow rate of said material flow is less than 10,000 grams/hour.

Preferably said flow tube means has an internal diameter of less than 2 millimeters.

Preferably said flow tube means has an internal diameter of less than 2 millimeters and that said mass flow rate of said material flow is less than 10,000 grams per hour.

Preferably mass flow rate of said material flow is less than 10 grams/hour.

Preferably said flow tube means has an internal diameter of less than 0.2 millimeters.

Preferably said flow tube has an internal diameter of less than 0.2 millimeters and that said mass flow rate of said material flow is less than 10 grams per hour.

Preferably said flow tube means has an internal diameter of less than 0.9 millimeters.

Preferably said flow tube means has an internal diameter of less than 0.9 millimeters and that said mass flow rate is less than 10,000 grams per hour.

Preferably said flow tube means comprises a single flow tube.

Preferably said flow tube means comprises a first flow tube and a second flow tube parallel to said first flow tube;
said driver coil is positioned intermediate said first flow tube and said second flow tube to vibrate said first flow tube and said second flow tube in phase opposition.

Preferably said first flow tube and said second flow tube are U-shaped with each having a left leg and a right leg connected by a top center element;
said pick-off means comprises first and second optical pick-offs proximate said flow tubes for generating said pick-off signals representing said Coriolis deflections of said flow tubes.

Preferably said driver coil is positioned proximate the axial mid portion of said top center element.

Preferably said magnetic material comprises hard magnetic material having internal magnetic fields;
said magnetic material extends along the axial length of said flow tubes so that the magnetic field of said material is applied to said pick-offs;
said pick-offs are responsive to the magnetic field of said magnetic material and to said Coriolis deflections of said U-shaped flow tubes to generate said pick-off signals representing said Coriolis deflections.

Preferably said pick-off means comprises first and second optical pick-offs proximate said flow tubes for generating said output signals representing said Coriolis deflections of said flow tubes.

Preferably said flow tube is formed of stainless steel.

Preferably said flow tube means is formed of hard magnetic material having internal North/South magnetic fields;
said pick-offs means are magnetic transducers;
said magnetic material axially extends on said flow tube means proximate said driver coil and said magnetic transducers; and
said vibration of said material filled flow tube means induces magnetic fields representing said Coriolis deflections in said magnetic transducers.

Preferably flow tube means comprises dual straight flow tubes;
said driver coil is positioned intermediate said flow tubes and is effective to vibrate said dual flow tube in phase opposition.

Preferably flow tube means comprises dual straight parallel flow tubes;
said Coriolis flowmeter further comprises a pair of driver coils positioned on the outer sides of said flow tubes and being effective to vibrate said dual flow tubes in phase opposition.

Preferably said pick-offs are optical pick-offs.

Preferably said pick-offs are magnetic transducers.

Preferably said driver coil is effective to vibrate said flow tube means in phase opposition in a push-pull mode;
said pick-off means comprises magnetic transducers that interact with the magnetic fields of said vibrating flow tube means to generate said pick-off signals.

Preferably said flow tube means comprises a pair of said straight flow tubes;
said driver coil is positioned intermediate said flow tubes proximate the axial center portion of said flow tubes to vibrate said flow tubes transversely in phase opposition;
said transducers are positioned intermediate said flow tube on opposite sides of said drive coil.

Preferably said flow tube means comprises a pair of U-shaped flow tubes;
said driver coil is positioned intermediate said flow tubes proximate a top axial center portion of said flow tubes;
said transducers are positioned intermediate said flow tubes on opposite sides of said drive coil.

BRIEF DESCRIPTION OF THE DRAWINGS

The above and other advantages and features of the invention are better understood taken in conjunction with a reading of the following detailed description taken in conjunction with the drawings in which.

DETAILED DESCRIPTION

Figure 1:
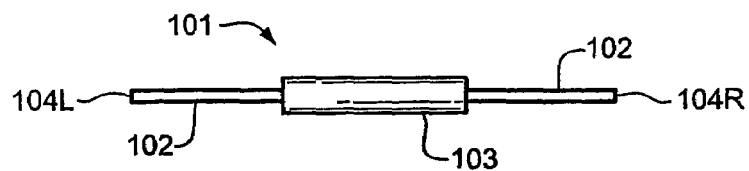
FIG. 1 discloses the details of one possible exemplary embodiment of a straight flow tube.

Description of FIG. 1

FIG. 1 discloses the details of a straight flow tube 101 comprising a hollow tube 102 having an axial portion surrounded by magnetic element 103 which can comprise either a hard magnetic material or a soft ferrous magnetic material. Hollow tube 102 has a left end 104L and a right end 104R. Magnetic element 103 may be a plating applied to the surface of straight tube 102. The plating is a thin layer having a thickness of approximately 0.0013 cm. The plated element 103 may be applied over the axial length of flow tube 102 as shown in FIG. 11 or may be concentrated in the middle axial portion of flow tube 102 as shown on FIGS. 1 and 10. In one possible exemplary embodiment, element 103 may be a magnetic coating that behaves exactly like a magnet. This material can be deposited with plasma deposition systems. The use of such material permits the element 103 to behave exactly as a magnet having a North or South magnetic field. This, in turn, permits the flow tube 101 to be vibrated by single driver coil in a "push-pull" operation.

In accordance with a second possible exemplary embodiment, element 103 may comprise a soft, ferrous magnetic material that does not have its own North/South field, but which may be operated in association with a single coil which can only attract element 103 to the coil. A drive system of this type is referred to as a "pull-only" system since the driver coil has the capability of only attracting the ferrous material 103. The ferrous material 103 is attracted to the energized coil regardless of the current direction through the coil. The flow tube 101 is vibrated when in use by energizing an associated driver coil to attract ferrous element 103 towards the coil. The inherent elasticity of flow tube 101 is utilized to bend the flow tube back to its rest state away when current through the driver coil ceases. A flow tube and associated coil of this type is shown on FIG. 8.

Figure 9:
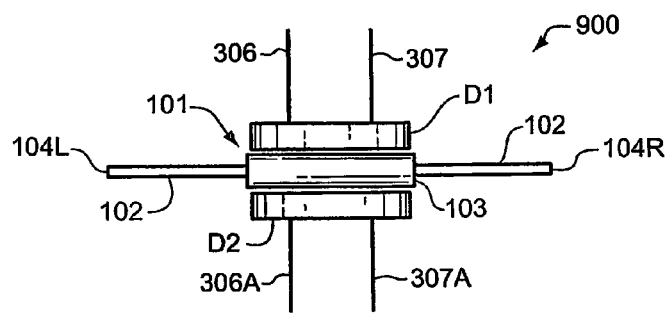
FIG. 9 discloses the flow tube of FIG. 1 associated with a "push-pull" type of driver.

Alternatively, the flow tube 101 may be operated with the use of two driver coils as shown on FIG. 9 to vibrate flow tube 102 and its element 103 as coils D1 and D2 are alternately energized by current flow.

Figure 2:
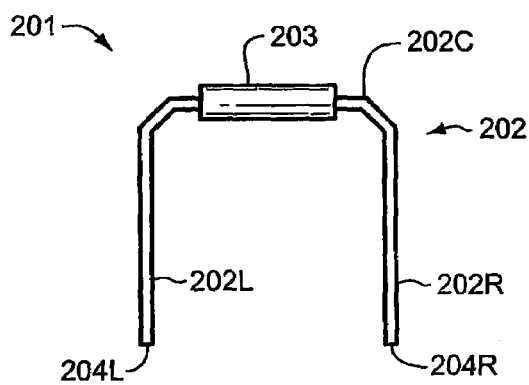
FIG. 2 discloses the details of an exemplary U-shaped flow tube.

Description of FIG. 2

FIG. 2 discloses a U-shaped flow tube 201 that is similar to flow tube 101. U-shaped flow tube 201 comprises a tube element 202 having a left side 202L and a right side 202R together with a magnetic element 203 coupled to the top center portion 202C of tube 202. U-shaped tube 202 has a bottom left terminus 204L and bottom right terminus 204R. When in use, flow tube 202 is vibrated by the magnetic interaction between magnetic element 203 and a associated driver coil as shown on FIGS. 5 and 6.

Figure 3:
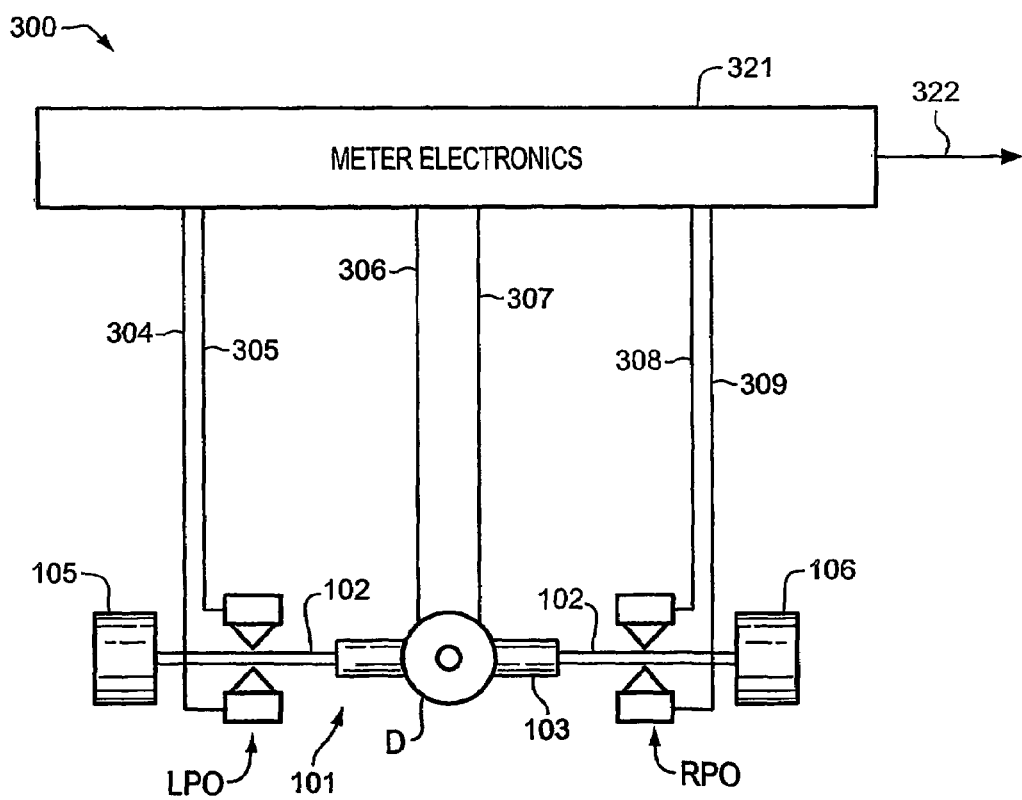
FIGS. 3 and 4 disclose the details of a Coriolis mass flowmeter embodying the straight flow tube of FIG. 1.
Figure 4:
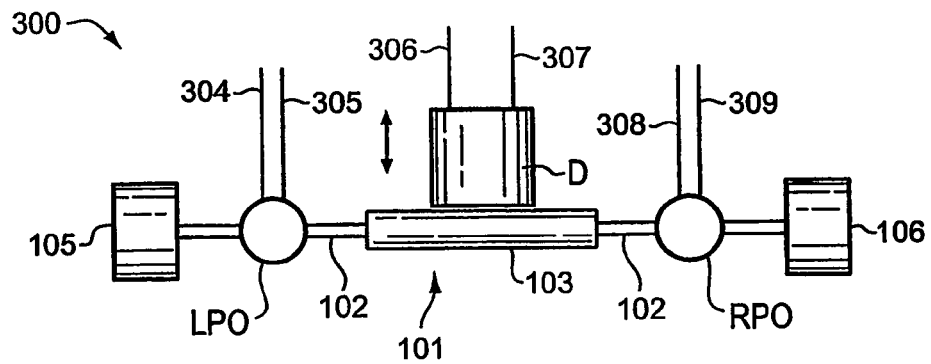

Description of FIGS. 3 and 4

FIGS. 3 and 4 disclose flow tube 101 embodied in a Coriolis mass flowmeter 300. Coriolis mass flowmeter 300 includes flow tube assembly 101, that includes flow tube 102, magnetic material 103, driver coil D, left pick-off LP0, right pick-off RP0, a left flange or process connection 105 and a right flange or process connection 106. Coriolis mass flowmeter 300 further includes meter electronics 321 whose conductors 306 and 307 controllably energize driver coil D to vibrate flow tube 101 in a pull-only mode in which the current through the energized coil D deflects flow tube 101 towards the driver coil with the natural elasticity of flow tube 101 being used to restore flow tube 101 to its rest state upon the cessation of current through driver coil D.

The material flow to be processed is received by process connection 105 from a material source not shown. It then flows to the right through flow tube 102 towards process connection 106 from which it exits the Coriolis mass flowmeter. The vibration of flow tube 102 by driver coil D together with the material flow induces Coriolis deflections in flow tube 102. These deflections are detected by pick-offs LP0 and RP0 and converted to electric signals. The electrical signals and applied over paths 304, 305, 308 and 309 to meter electronics 321 which processes the signals and generates information pertaining to the material flow. This information is applied over output path 322 to a utilization circuit not shown. Meter electronics 321 is shown only on FIG. 3 in order to minimize the complexity of the drawings.

Figure 7:
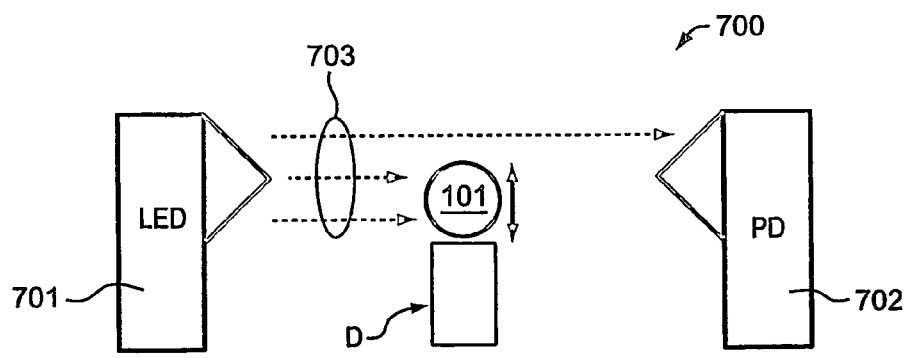
FIG. 7 discloses the details of a light emitting diode and a photo detector comprising the pick-offs of FIGS. 3–6.

Driver coil D, when energized intermittently by conductors 306 and 307, vibrates flow tube 102 in a "pull-only" mode in which the energized coil D intermittently attracts tube 102. Flow tube 102 returns to its rest state due to its inherent elasticity upon each cessation of current through coil D. Driver coil D vibrates the flow tube up and down as shown on FIG. 4. The vibration of tube 102 as portrayed on FIG. 3 is inward and outward with respect to the plane of the paper of FIG. 3. Pick-offs LP0 and RP0 are advantageously optical pick-offs embodying light emitting diode 701 and photo detector 702 as shown on FIG. 7. Flow tube 102 vibrates under the influence of driver coil D. In so doing, it interrupts and modulates the light beam 703 transmitted from LED 701 towards photo detector 702. Photo detector 702 translates the received light wave pattern into output signals which are transmitted over paths 304, 305, 308 and 309 to meter electronics 321.

Figure 5:
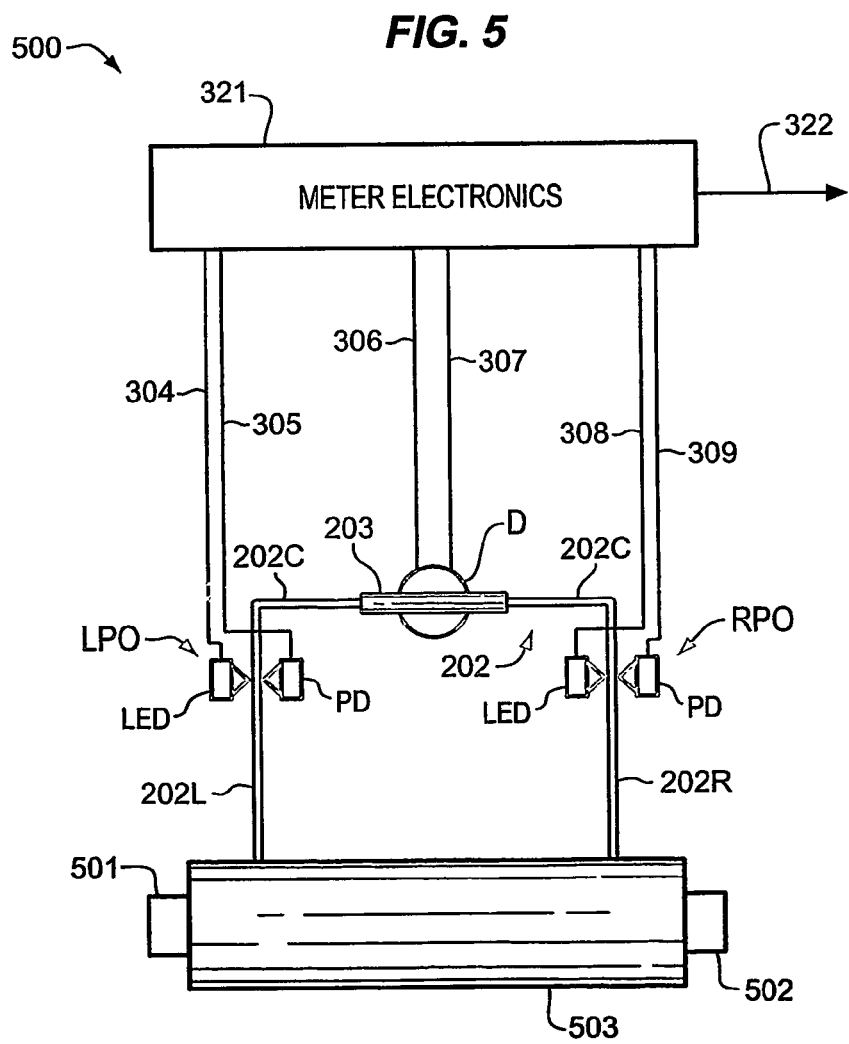
FIGS. 5 and 6 disclose the details of a Coriolis mass flowmeter embodying the U-shaped flow tube of FIG. 2.
Figure 6:
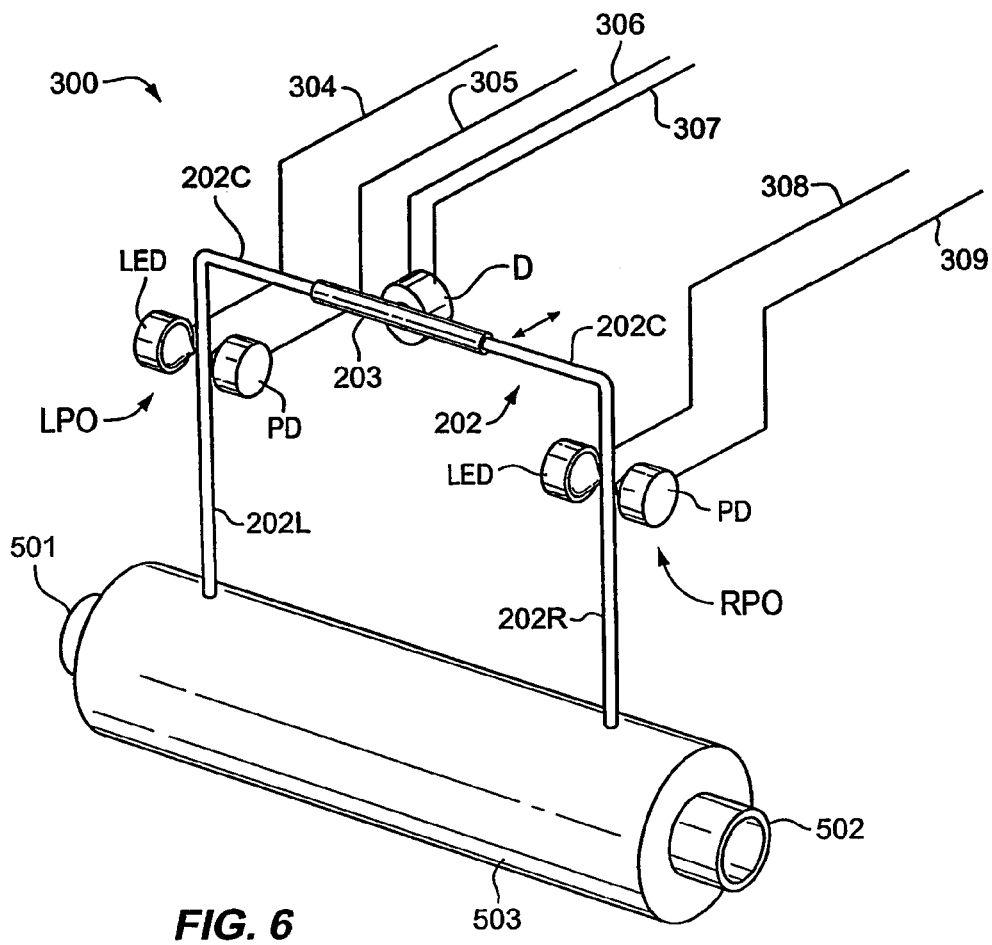

Description of FIGS. 5 and 6

FIGS. 5 and 6, respectively, show a front side and a perspective view of flow tube 201 of FIG. 2 embodied into a Coriolis mass flowmeter 500. Legs 202L and 202R of U-shaped flow tube 202 are affixed to manifold 503 which receives material flow at its process connection 501, extends the received flow through leg 202L and further extends it through the center portion 202C and right leg 202R from which the material flow is received by the output end of manifold 503 and applied to right side process connection 502. Driver coil D vibrates flow tube 202C in a "pull-only" mode in a manner similar to that described with respect to Coriolis mass flowmeter 300 FIGS. 3 and 4. The vibration of flow tube 202 together with the material flow induces Coriolis deflections of flow tube 202 which are detected by pick-offs LP0 and RP0 and applied over conductors 304, 305, 308 and 309 to meter electronics 321 which process the signals and generates output information pertaining to the material flow. This output information is extended over path 322 to a utilization circuit not shown.

The Coriolis mass flowmeter of FIGS. 5 and 6 have been produced and found to meet the 10 to 1 ratio of the mass of the material filled flow tube to the mass of the driver and pick-offs. One such embodiment included a flow tube having an internal diameter of 0.2 mm and a flow rate of 10 grams/hour. A second embodiment included a flow tube having an internal diameter of 0.9 mm and a flow rate of 10,000 grams/hour.

Figure 8:
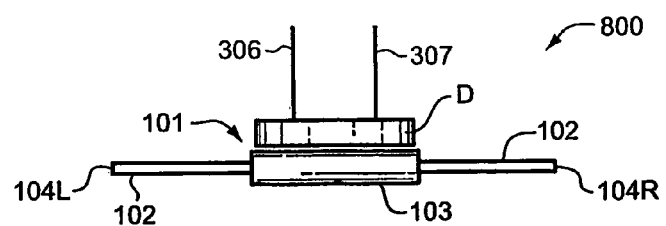
FIG. 8 discloses the flow tube of FIG. 1 associated with a single, "pull-only" driver coil.

Description of FIGS. 8 and 9

Flow tubes 102 are operated in a "pull-only" mode of vibration using a single driver coil D associated with the flow tube as shown on FIG. 8. In this mode, current through the driver coil D attracts the flow tube 102 from its natural rest position. Cessation of the flow permits the natural elasticity of the flow tube 102 to restore it to its rest position. Alternatively, flow tube 102 may be vibrated in a "push-pull" mode using a pair of driver coils D1 and D2 as shown on FIG. 9. In this mode, current through coil D1 deflects element 103 and flow tube 102 upwards. The cessation of current through driver coil D1 and together with current through driver coil D2 deflects element 103 and flow tube 102 downwards. This alternate energization and de-energization of driver coils D1 and D2 creates alternate magnetic fields which vibrates flow tube 102 transversely as shown on FIG. 9. The embodiment of FIG. 8 may be used in applications in which the natural elasticity of the flow tube 102 structure is adequate to restore flow tube 102 to its rest state when driver coil D is not energized. The embodiment of the "push-pull" embodiment of FIG. 9 may be used in applications in which it is desired that flow tube 102 be vibrated under the influence of magnetic fields in each direction transverse to the longitudinal access to the flow tube. U-shaped flow tube 202 may similarly be operated in either a "pull-only" or a "push-pull" mode. Conductors 306A and 307A of FIG. 9 are connected to meter electronics 321.

Description of FIGS. 10–13

Figure 10:
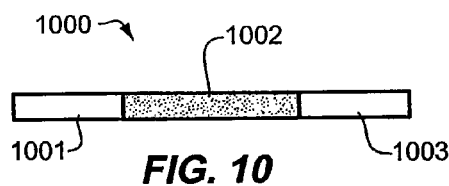
FIGS. 10–13 disclose alternative embodiment of a straight flow tube.
Figure 11:
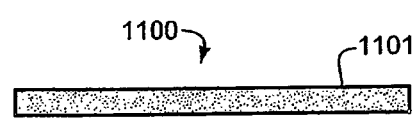
Figure 12:
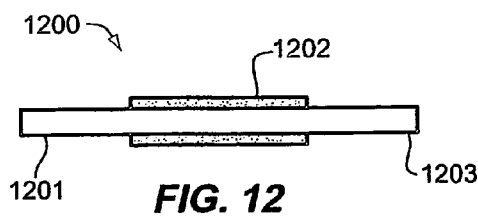
Figure 13:
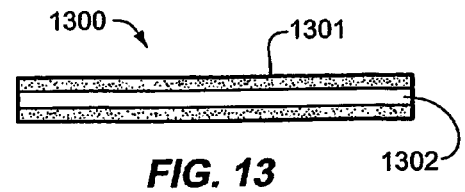

FIGS. 10–13 illustrate different alternative structures that may be used to embody flow tubes 101 and 202. FIG. 10 illustrates a flow tube in which the magnetic material is integral to axial center portion 1002 of flow tube 1000. End portions 1001 and 1003 do not contain the magnetic material. The embodiment of FIG. 11 differs from that of FIG. 10 in that entirety of the flow tube 1100 is darkened to indicate that the magnetic material is integral to the entire length of the flow tube. The magnetic material of flow tube 1100 of FIG. 11 may be either of the soft or hard type. Also, the flow tube 1100 may be formed in its entirety of a material such as steel or stainless steel 400 having its own internal North/South field. FIG. 12 illustrates an embodiment in which the magnetic material is applied as a film to the surface of the flow tube. In FIG. 12, the magnetic material 1202 is applied to the center of 1202 of the flow tube while the end portions 1201 and 1203 do not have the magnetic material. The embodiment of FIG. 13 differs from that of FIG. 12 in that the flow tube 1300 has magnetic material 1301 applied to its surface for the entirety of its length. The magnetic material of the flow tubes of FIGS. 10–13 may be either of the soft or hard type.

FIGS. 10–13 show alternative embodiments for the straight tube 101 of FIG. 1. The U-shaped tube 203 may have correspondingly similar embodiments within that the magnetic material may be integral to all or less than all of the flow tube. Alternatively, the magnetic material may be deposited on the surface of all or less than all of the length of the U-shaped flow tube 203 of FIG. 2. Alternatively, the U-shaped flow tube of FIG. 2 may be formed of a material such as steel or stainless steel 400 having its own internal North/South field.

The term "magnetic material" as used herein applies to "soft" ferrous material which does not have its own magnetic North/South field. It also applies to hard magnetic material which can have a permanent North/South field.

Figure 14:
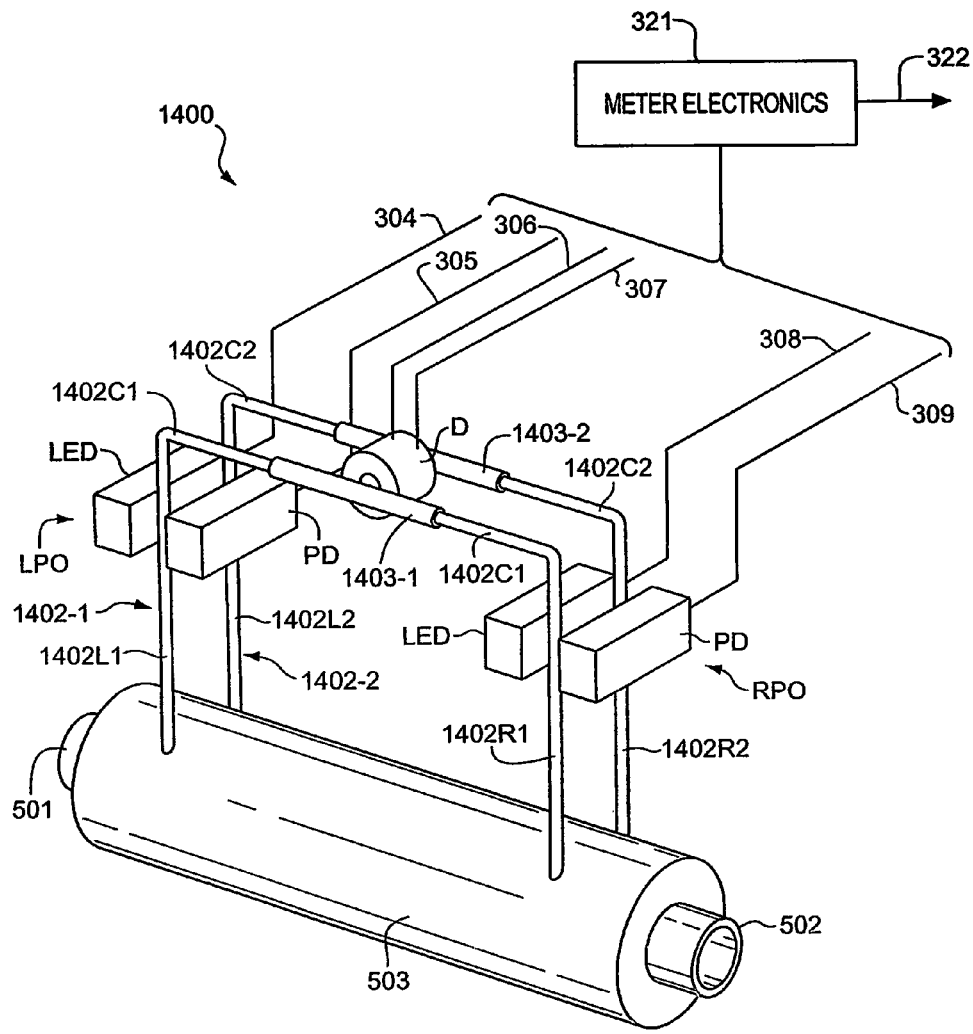
FIG. 14 discloses a dual U-shaped flow tube embodiment of the invention.

Description of FIG. 14

FIG. 14 discloses a dual U-shaped flow tube Coriolis mass flowmeter 1400 embodying the invention. The Coriolis mass flowmeter 1400 is analogous to the single U-shaped flow tube Coriolis mass flowmeter of FIG. 6 except that the Coriolis mass flowmeter of FIG. 14 has a pair of U-shaped flow tubes 1402-1 and 1402-2. A driver coil D is positioned intermediate the two flow tubes. The magnetic material on the axial mid-portion of the top element of the flow tubes are designated 1403-1 and 1403-2. The magnetic material may be either of the hard or soft type. If it is of the soft type, the driver coil D vibrates the two flow tubes in phase opposition with the flow tubes being attracted to the driver coil D when energized with current flow and is returned to their normal rest position due to their inherent elasticity when current flow ceases. If the magnetic material is of the hard type having its internal North/South fields, driver coil D can vibrate the two flow tubes bi-directionally in phase opposition. The pick-offs LP0 and RP0 comprise a light emitter and a photo detector. These operate in a well known manner to generate an output signal representing vibrations of the two flow tubes. The output signals are modulated by the amount of light received by the photo detector in response to the vibratory positions of the flow tubes. The output conductors 304, 305, 308, 309, 306 and 307 extending to meter electronics 321 are designated in the same manner as described for FIG. 6. These functions include the control of driver D so that it vibrates the two flow tubes at their resonant frequency of the flow tubes with material flow. These functions further include the extension of the pick-off output signals to meter electronics 321 so that it can generate information pertaining to the material flow and extend this information over path 322 to a utilization circuit not shown. Manifold 503 operates in the same manner as described in connection with FIG. 6. The left legs of the U-shaped flow tubes are designated 1402L1 and 1402L2. The right legs are designated 1402R1 and 1402R2. The top element of the flow tubes are designated are 1402C1 and 1402C2.

Figure 15:
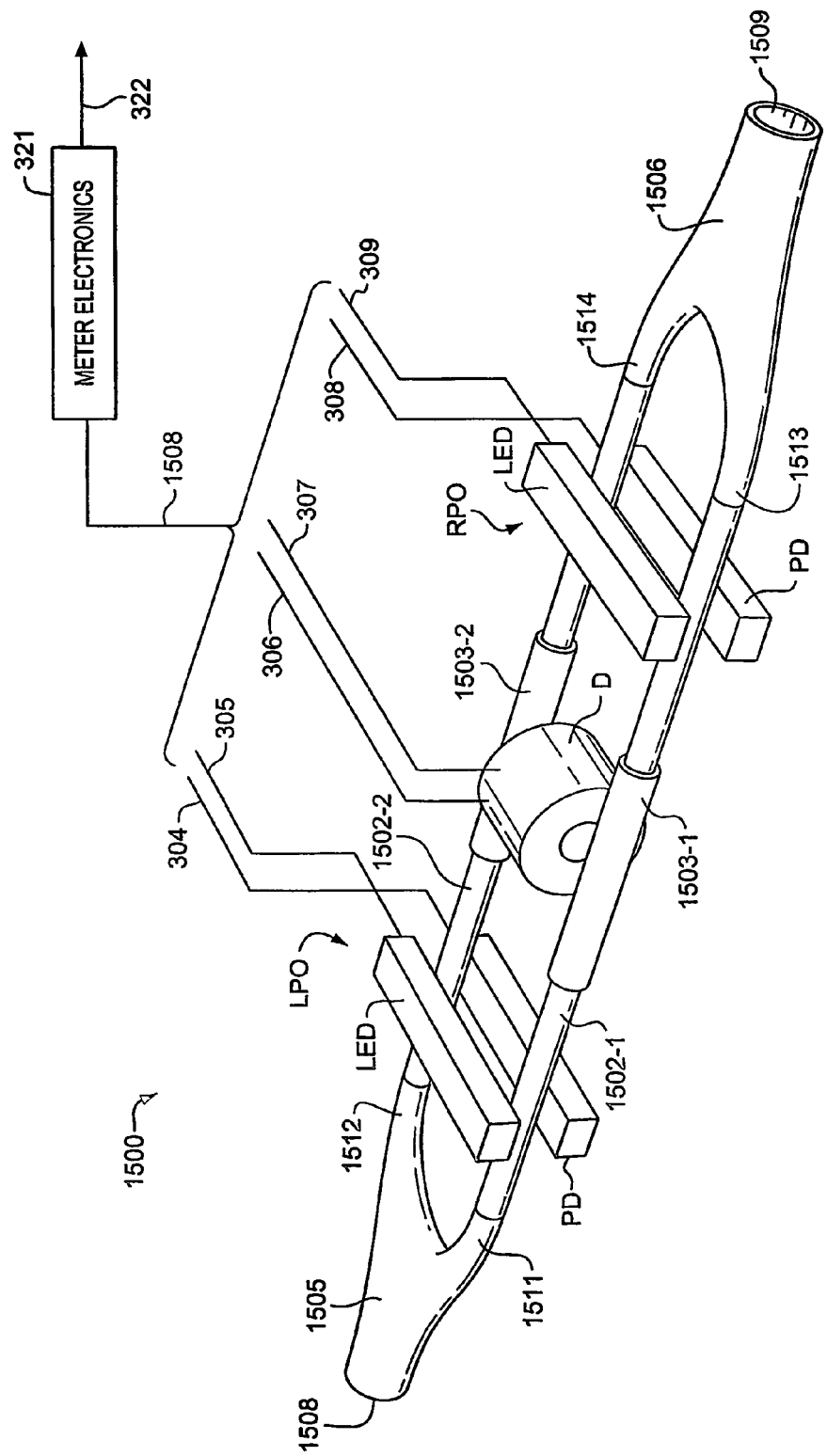
FIGS. 15–17 disclose dual straight flow tube embodiments of the invention.
Figure 16:
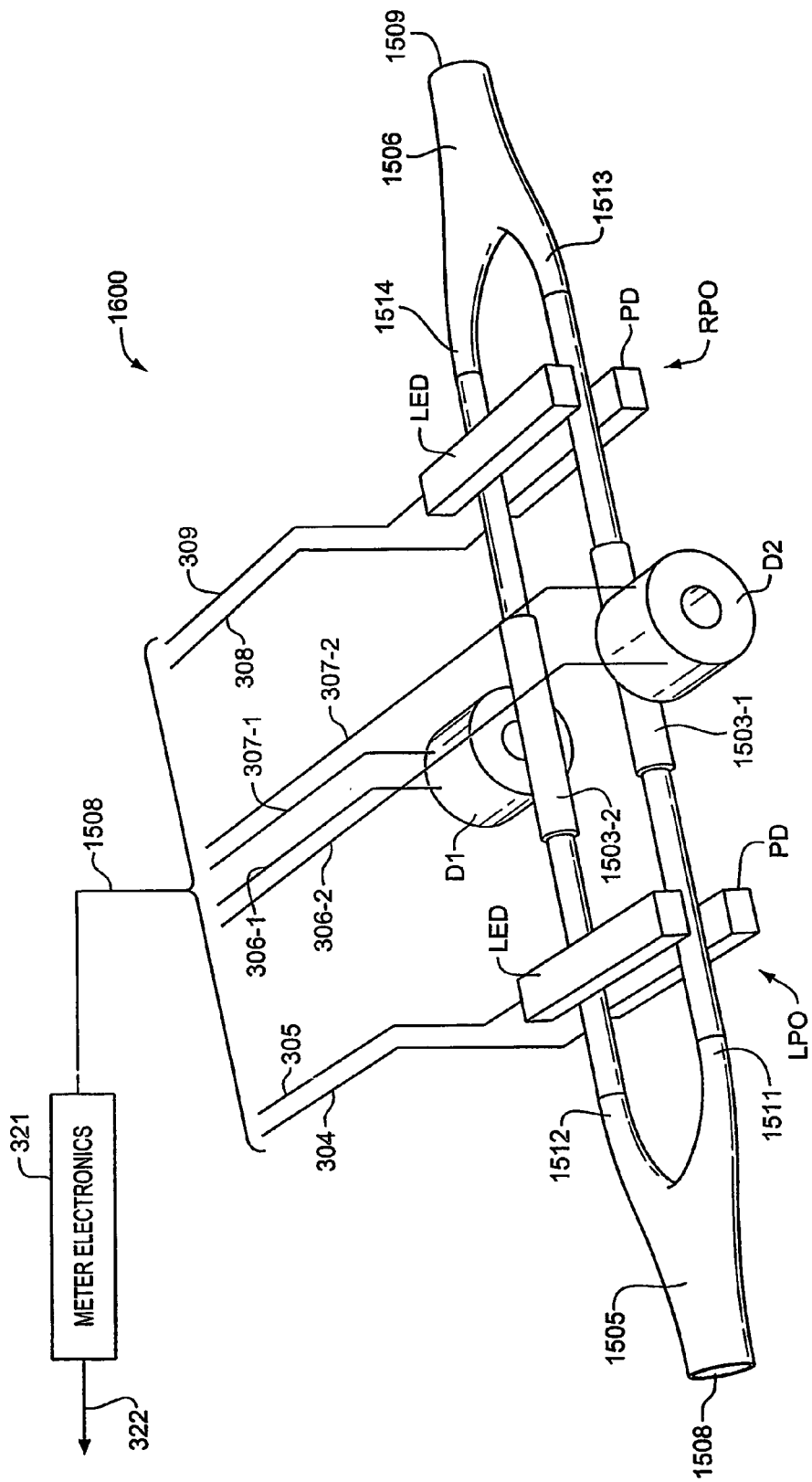

Description of FIGS. 15 and 16

FIGS. 15 and 16 disclose dual straight tube Coriolis mass flowmeters 1500 and 1600. The embodiment of FIG. 15 uses the single driver coil D positioned intermediate the two flow tubes to vibrate the flow tubes in phase opposition. When flow tube elements 1503-1 and 1503-2 comprise soft magnetic material, driver coil D is effective to vibrate the flow tubes in phase opposition using a pull-only mode. In this mode, the flow tubes are attracted to driver coil D only when energized. Upon the cessation of current flow, the flow tubes return to their rest state due to their inherent elasticity. When the magnetic material is of the hard type having its internal North/South magnetic fields, driver coil D is effective to vibrate the flow tubes in a "push-pull" mode. The pick-offs LP0 top and LP0 bottom as well as the pick-offs RP0 top and RP0 bottom may be of the optical type as shown and described in FIG. 14 to generate pick-off signals representing the vibratory positions of the flow tubes. The pick-off signals are transmitted to meter electronics 321 in the same manner as described for FIG. 14.

The embodiment of FIGS. 15 and 16 includes a left input manifold 1505 which receives the material flow at its opening 1508. The embodiment of FIGS. 10 and 15 further includes output manifold 1506 connected to the right side of the flow tubes and having an output 1509 from which material is discharged by the Coriolis mass flowmeter.

FIG. 16 differs from the embodiment of FIG. 15 only it its provision of a pair of driver coils designated D1 and D2. These driver coils D1 and D2 function under control of meter electronics 321 to vibrate the two flow tubes in phase opposition. The "pull-only" mode is used if the magnetic material is of the soft type. The "push-pull" mode is used if the magnetic material is of the hard type.

Figure 17:
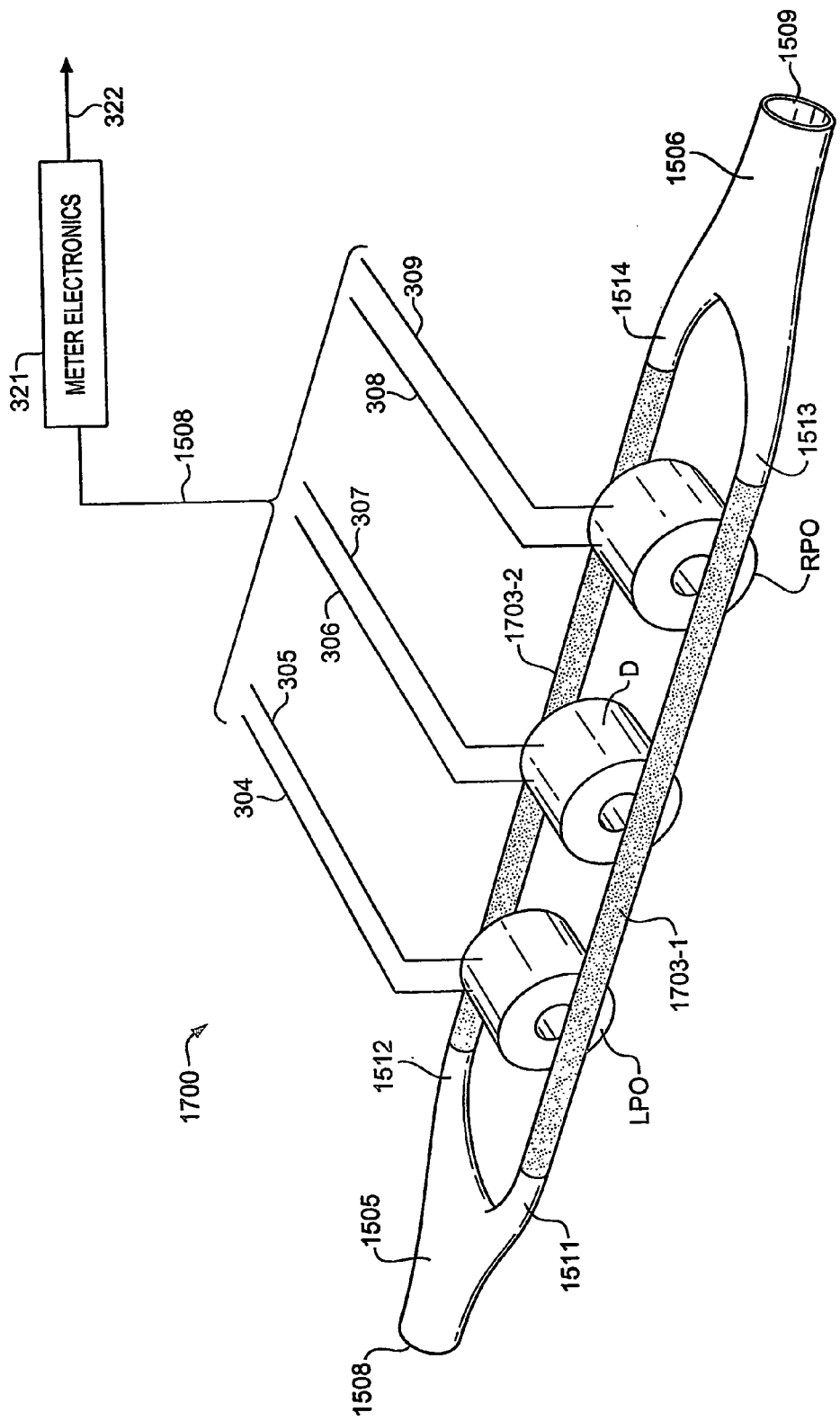

Description of FIG. 17

FIG. 17 discloses a dual straight tube Coriolis mass flowmeter in which the flow tube is made of magnetic steel having its own internal North/South magnetic fields. Steels of this type may be stainless steel 400 or conventional steel having the capability of having its own internal magnetic field. With the use of such steels, a separate magnetic coating or material either internal or external is not required. Instead, the internal magnetic fields of the flow tubes made out of such steels can be used. As shown on FIG. 17, the single driver coil D is controlled by the meter electronics 321 to vibrate two flow tubes 1713-1 and 1703-2 in phase opposition. The vibratory position of the two flow tubes is detected by magnetic pick-offs LP0 and RP0 which transmit signals to the meter electronics 321 representing the flow tube vibrations including the Coriolis deflection generated by the vibrating flow tubes with the material flow. The advantage of the Coriolis mass flowmeter of FIG. 17 is that the deposition of an external magnetic coating or the use of special manufacturing techniques to add magnetic material to the flow tubes is not required since the flow tubes are formed of material, having its own magnetic field. A Coriolis mass flowmeter having U-shaped flow tubes as shown on FIGS. 5, 6, and 14 may be provided using magnetic steel to form the flow tube/tubes instead of hard or soft magnetic coatings. As shown in FIG. 17, the dual U-tube embodiment uses a driver coil to vibrate the flow tube/tubes in the "push-pull" mode using magnetic transducers as pick-offs to detect the flow tube deflections including Coriolis deflections from material flow.

It is expressly understood that the claimed invention is not to be limited to the description of the preferred embodiment but encompasses other modifications and alterations within the scope and spirit of the inventive concept. The term "soft magnetic material" or "ferrous material" shall be understood as characterizing material that is attracted by a magnetic field, but does not have its own internal North/South magnetic field.

Both the "soft" or the "hard magnetic material" may be applied as a coating, film, or outer layer to an already formed flow tube, or may be combined with a flow tube when fabricated to form an integrated structure that functions as the soft or hard magnetic material used in its fabrication.

The terms "fluid" and "fluid flow" used therein shall be understood as encompassing fluids such as liquids and the like as well as any material that flows such as flurries, plasma, gases, etc. Also, while the disclosed invention is particularly advantageous for use with small Coriolis mass flowmeters having small flow tubes and small flow rates, it shall be understood that the principles of the present invention are also advantageous and applicable to flowmeters of any size and formed of any material.

What is claimed:

1. A Coriolis flow meter comprising:
   flow tube means (102) adapted to receive a material flow;
   a driver coil;
   meter electronics (321) that applies a drive signal to said driver coil (D) to vibrate said flow tube means with material flow;
   said flow tube means vibration with material flow generates Coriolis deflections of said flow tube means; and
   pick-off means (LP0 RP0) coupled to said flow tube means for generating pick-off signals representing said Coriolis deflections of said flow tube means; and
   means (304, 305, 308, 309) for applying said pick-off signals to said meter electronics for the generation of output signals representing said material flow;
   characterized in that:
   magnetic material (103) embodies at least a part of said flow tube means;
   said driver coil is responsive to said application of said drive signal to generate a magnetic field that interacts with said magnetic material to vibrate said material filled flow tube means.

2. The Coriolis flow meter of claim 1 characterized in that said magnetic material comprises a layer of ferrous material (103, 203) on at least a part of the outer surface of said flow tube means.

3. The Coriolis flow meter of claim 2 characterized in that said magnetic material (103, 203) is extant on less than all of the axial length of said flow tube means.

4. The Coriolis flow meter of claim 2 characterized in that said magnetic material (1101) is extant on the entirety of the axial length of said flow tube means.

5. The Coriolis flow meter of claim 1 characterized in that said magnetic material comprises ferrous material (1101) integral to at least an outer radial portion of said flow tube means;
   said ferrous material is devoid of an internal magnetic field.

6. The Coriolis flow meter of claim 5 characterized in that said magnetic material (1002) embodies less than all of the axial length of said flow tube means.

7. The Coriolis flow meter of claim 5 characterized in that said magnetic material (1101) embodies the entirety of the axial length of said flow tube means.

8. The Coriolis flow meter of claim 1 characterized in that said magnetic material (103, 203) comprises hard magnetic material having self-contained magnetic fields.

9. The Coriolis flow meter of claim 8 characterized in that said magnetic material comprises an outer layer extant on less than all of the axial length of said flow tube means.

10. The Coriolis flow meter of claim 8 characterized in that said magnetic material (1301) comprise an outer layer extant on the entirety of the axial length of said flow tube means.

11. The Coriolis flow meter of claim 8 characterized in that said magnetic material (1101) is integral to at least an outer radial portion of said flow tube means.

12. The Coriolis flow meter of claim 11 characterized in that said magnetic material (1101, 1301) embodies the entirety of the axial length of said flow tube means.

13. The Coriolis flow meter of claim 8 characterized in that said magnetic material (1002, 1202) embodies less than all of the axial length of said flow tube means.

14. The Coriolis flow meter of claim 1 characterized in that said flow tube means (102) is straight.

15. The Coriolis flow meter of claim 1 characterized in that said flow tube means (202) is of an irregular shape.

16. The Coriolis flow meter of claim 1 characterized in that said flow tube means (202) is U-shaped.

17. The Coriolis flowmeter of claim 1 characterized in that said pick-off means comprises a first and a second optical pick-off (700) each comprising a light emitter and a light receiver that converts received light into electrical signals.

18. The Coriolis flow meter of claim 1 characterized in that said driver coil (D) vibrates said flow tube means in a pull-only mode in which said flow tube means material is magnetically attracted to said driver coil when energized with a current flow and in which the inherent elasticity of said flow tube means returns said flow rube means to a rest state upon the cessation of current flow.

19. The Coriolis flow meter of claim 1 characterized in that said driver coil defines a first driver coil (D1);
   said Coriolis flow meter further comprising a second driver coil (D2);
   said first driver coil and said second driver coil are positioned on opposite sides of said flow tube means;
   said meter electronics applies opposing sinusoidal currents to said first driver coil and to said second driver coil to generate cyclical changing magnetic fields that vibrate said flow tube means cyclically in a push-pull mode between said first driver coil and said second driver coil.

20. The Coriolis flow meter of claim 1 characterized in that mass flow rate of said material flow is less than 10,000 grams/hour.

21. The Coriolis flow meter of claim 1 characterized in that said flow tube means has an internal diameter of less than 2 millimeters.

22. The Coriolis flow meter of claim 1 characterized in that said flow tube means has an internal diameter of less than 2 millimeters and that said mass flow rate of said material flow is less than 10,000 grams per hour.

23. The Coriolis flow meter of claim 1 characterized in that mass flow rate of said material flew is less than 10 grams/hour.

24. The Coriolis flow meter of claim 1 characterized in that said flow tube means has an internal diameter of less than 0.2 millimeters.

25. The Coriolis flow meter of claim 1 characterized in that said flow tube means has an internal diameter of less than 0.2 millimeters and that said mass flow rate of said material flow is less than 10 grams per hour.

26. The Coriolis flow meter of claim 1 characterized in that said flow tube means has an internal diameter of less than 0.9 millimeters.

27. The Coriolis flow meter of claim 1 characterized in that said flow tube means has an internal diameter of less than 0.9 millimeters and that said mass flow rate is less than 10,000 grams per hour.

28. The Coriolis flow meter of claim 1 characterized in that said flow tube means comprises a single flow tube (102, 202).

29. The Coriolis flow meter of claim 1 characterized in that said flow tube means comprises a first flow tube (1402C1) and a second flow tube (1402C2) parallel to said first flow tube;
said driver coil is positioned intermediate said first flow tube and said second flow tube to vibrate said first flow tube and said second flow tube in phase opposition.

30. The Coriolis flow meter of claim 29 characterized in that said first flow tube and said second flow tube are U-shaped with each having a left leg and a right leg connected by a top center element;
said pick-off means comprises first and second optical pick-offs proximate said flow tubes for generating said pick-off signals representing said Coriolis deflections of said flow tubes.

31. The Coriolis flow meter of claim 30 characterized in that said driver coil (D) is positioned proximate the axial mid portion (1403-1, 1403-2) of said top center element.

32. The Coriolis flow meter of claim 29 characterized in that said magnetic material comprises hard magnetic material having internal magnetic fields;
said magnetic material extends along the axial length of said flow tubes so that the magnetic field of said material is applied to said pick-offs (LP0, RP0);
said pick-offs (LP0, RP0) are responsive to the magnetic field of said magnetic material and to said Coriolis deflections of said U-shaped flow tubes to generate said pick-off signals representing said Coriolis deflections.

33. The Coriolis flow meter of claim 29 characterized in that said pick-off means comprises first and second optical pick-offs (700) proximate said flow tubes for generating said output signals representing said Coriolis deflections of said flow tubes.

34. The Coriolis flow meter of claim 1 characterized in that said flow tube is formed of stainless steel.

35. The Coriolis flow meter of claim 1 characterized in that:
said flow tube means is formed of hard magnetic material having internal North/South magnetic fields;
said pick-offs means (LP0, RP0) are magnetic transducers;
said magnetic material axially extends on said flow tube means proximate said driver coil and said magnetic transducers; and
said vibration of said material filled flow tube means induces magnetic fields representing said Coriolis deflections in said magnetic transducers.

36. The Coriolis flow meter of claim 1 characterized in that flow tube means comprises dual straight flow tubes (1511, 1512);
said driver coil (D) is positioned intermediate said flow tubes and is effective to vibrate said dual flow tube in phase opposition.

37. The Coriolis flow meter of claim 1 characterized in that flow tube means comprises dual straight parallel flow tubes;
said Coriolis flow meter further comprises a pair of driver coils (D1, D2) positioned on the outer sides of said flow tubes and being effective to vibrate said dual flow tubes in phase opposition.

38. The Coriolis flow meter of claim 37 characterized in that said pick-offs are optical pick-offs.

39. The Coriolis flow meter of claim 37 characterized in that said pick-offs are magnetic transducers.

40. The Coriolis flow meter of claim 39 characterized in that:
said flow tube means comprises a pair of U-shaped flow tubes (1401C1, 1401C2);
said driver coil (D) is positioned intermediate said flow tubes proximate a top axial center portion of said flow tubes; said transducers (LP0, RP0) are positioned intermediate said flow tubes on opposite sides of said drive coil.

41. The Coriolis flow meter of claim 1 characterized in that:
said driver coil (D) is effective to vibrate said flow tube means (1703-1, 1703-2) in phase opposition in a push-pull mode;
said pick-off means comprises magnetic transducers that interact with the magnetic fields of said vibrating flow tube means to generate said pick-off signals.

42. The Coriolis flow meter of claim 1 characterized in that
said flow tube means comprises a pair of said straight flow tubes (1502-1, 1502-2);
said driver coil (D) is positioned intermediate said flow tubes proximate the axial center portion of said flow tubes to vibrate said flow tubes transversely in phase opposition;
said transducers are positioned intermediate said flow tube on opposite sides of said drive coil.

* * * * *